US010721366B1

(12) United States Patent
Griffith (10) Patent No.: US 10,721,366 B1
(45) Date of Patent: Jul. 21, 2020

(54) MULTIPLE FINISHING OPTIONS FOR A PRINT JOB

(71) Applicant: Xerox Corporation, Norwalk, CT (US)

(72) Inventor: Jeremy Griffith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/293,235

(22) Filed: Mar. 5, 2019

(51) Int. Cl.
  *H04N 1/00* (2006.01)
  *G06F 3/12* (2006.01)
  *G06F 3/0482* (2013.01)
  *G06F 3/0481* (2013.01)

(52) U.S. Cl.
  CPC ....... *H04N 1/00466* (2013.01); *G06F 3/0482* (2013.01); *G06F 3/04817* (2013.01); *G06F 3/1256* (2013.01); *H04N 1/00424* (2013.01); *H04N 1/00437* (2013.01)

(58) Field of Classification Search
  None
  See application file for complete search history.

(56) References Cited

U.S. PATENT DOCUMENTS

| 7,812,976 | B2 | 10/2010 | Perry et al. | |
| 8,884,969 | B2 | 11/2014 | Dangler et al. | |
| 2005/0162677 | A1* | 7/2005 | Toumanova | G06F 3/1204 358/1.13 |
| 2007/0143696 | A1 | 6/2007 | McComber | |
| 2007/0146784 | A1* | 6/2007 | Perry | G06Q 10/10 358/1.16 |

* cited by examiner

*Primary Examiner* — Lennin R Rodriguezgonzalez (57) ABSTRACT

A graphical user interface (GUI) to provide a plurality of finishing options for a print job is disclosed. For example, the GUI includes a mimic window to provide real-time animations of selected document parameter options and finishing options and a finishing options window below the mimic window, the options window comprising. The finishing options window includes a plurality of document parameter options and a plurality of finishing options that are displayed below the plurality of document parameter options.

15 Claims, 10 Drawing Sheets

MULTIPLE FINISHING OPTIONS FOR A PRINT JOB

The present disclosure relates generally to processing a print job and relates more particularly to providing multiple finishing options for a print job.

BACKGROUND

Printers are used to process print jobs. A printer may receive a print job request and then process the print job request into a printer document language that can be processed by the printer. For example, a digital front end (DFE) of the printer may perform the conversion of the print job into a printer document language. The print job can be completed by the printer and printed onto a print medium (e.g., paper).

Various options can be provided to a user when the user initiates a print job request. Currently, the options are provided in unintuitive fashion that can make it difficult or complicated for a user to decide which options he or she would like to select. In addition, the options that are provided may not be current with printer capabilities as the design and capability of the printers improve.

SUMMARY

According to aspects illustrated herein, there are provided a graphical user interface (GUI) and a non-transitory computer readable medium to provide a plurality of finishing options for a print job. One disclosed feature of the embodiments is a GUI that comprises a mimic window to provide real-time animations of selected document parameter options and finishing options and a finishing options window below the mimic window, the finishing options window comprising. The finishing options window comprises a plurality of document parameter options, wherein a selection of one of the plurality of document parameter options causes a new document parameter window of additional document parameter options associated with a document parameter option that is selected to open in the finishing options window and a plurality of finishing options that are displayed below the plurality of document parameter options, wherein a selection of one of the plurality of finishing options causes a new finishing option window of additional finishing options associated with a finishing option that is selected to open in the finishing options window.

Another disclosed feature of the embodiments is a non-transitory computer-readable medium having stored thereon a plurality of instructions, the plurality of instructions including instructions which, when executed by a processor, cause the processor to perform operations to generate a graphical user interface to provide a plurality of finishing options for a print job. The instructions include instructions to generate a mimic window to provide real-time animations of selected document parameter options and finishing options and to generate a finishing options window below the mimic window. The finishing options window comprises a plurality of document parameter options, wherein a selection of one of the plurality of document parameter options causes a new document parameter window of additional document parameter options associated with a document parameter option that is selected to open in the finishing options window and a plurality of finishing options that are displayed below the plurality of document parameter options, wherein a selection of one of the plurality of finishing options causes a new finishing option window of additional finishing options associated with a finishing option that is selected to open in the finishing options window.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a graphical user interface (GUI) to provide multiple finishing options for a print job. As discussed above, various options can be provided to a user when the user initiates a print job request. Currently, the options are provided in unintuitive fashion that can make it difficult or complicated for a user to decide which options he or she would like to select.

For example, some GUIs that provide a limited number of options and assume that certain options are known. For example, the GUI may provide a finishing option for stapling and hole-punching, but may not provide an option for an orientation of the print media. Other GUIs may be too complicated with navigation controls and page-by-page selection for different finishing options. Yet other GUIs may provide finishing options that are mixed together making it difficult for a user to decide which option or options to select.

In addition, the options that are provided may not be current with printer capabilities as the design and capability of the printers improve. For example, as printer technology and capabilities advance, different finishing options may be possible, but not shown in the GUI. For example, some printers may be able to create a Z-fold in the document in both a landscape and a portrait orientation. However, current GUIs for finishing options do not provide the user an option to select which orientation to create the Z-fold.

The present disclosure provides an apparatus to create a GUI that has an intuitive arrangement of finishing options. For example, each finishing option is provided as a separate option. In addition, new finishing options such as the orientation of a Z-fold are also provided in the GUI. The GUI may also provide an animated window that updates an image of the selected finishing options in real-time as the user selects and/or changes finishing options in the GUI for a print job.

Figure 1:
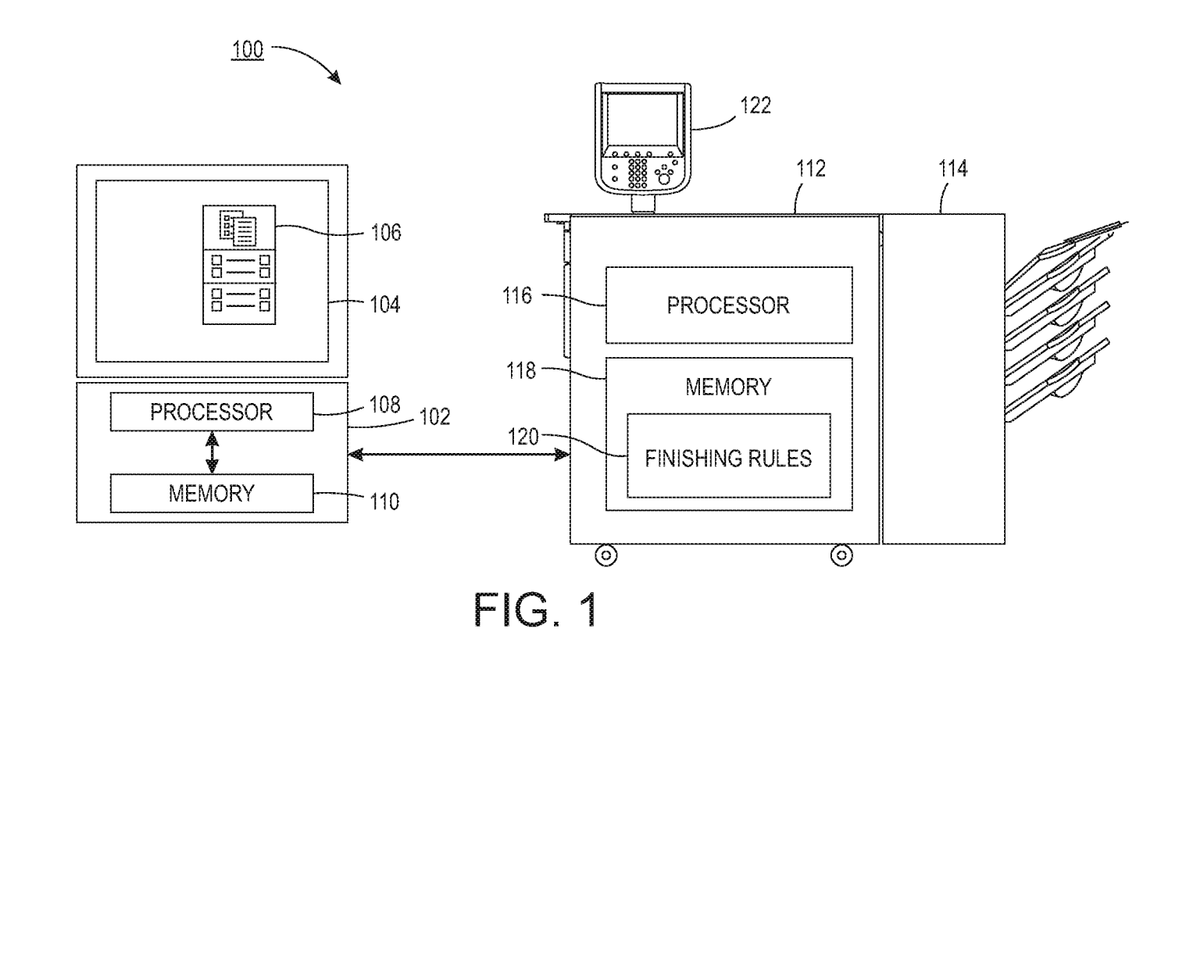
FIG. 1 illustrates a block diagram of a printer that includes a display to display a graphical user interface (GUI) of the present disclosure.

FIG. 1 illustrates an example system 100. The system 100 may include an endpoint device 102 having a display 104 that is communicatively coupled to a multi-function device (MFD) 112. The endpoint device 102 may be any type of computing system that can be used to transmit print jobs to the MFD 112. For example, the endpoint device 102 may be a desktop computer, a laptop computer, a tablet computer, and the like.

The endpoint device 102 may communicate with the MFD 112 over a wired or wireless connection. The wired or wireless connection may be over the Internet (e.g., an Internet protocol (IP) network) or a local area network (e.g., an office Intranet). The endpoint device 102 and the MFD 112 may include network interfaces (not shown) to establish the communication path (e.g., an Ethernet card, a wireless communication interface, and the like).

The display 104 may be a monitor, or any other type of display, that can display a graphical user interface (GUI) 106 of the present disclosure. The GUI 106 may provide a more intuitive and efficient experience in selecting finishing options associated with the MFD 112. The GUI 106 is illustrated and discussed in further details below.

In one embodiment, the MFD 112 may be any type of printing device that may print, fax, copy, scan, and the like. The MFD 112 may have a finishing module 114 that may provide finishing options for a print job received from the endpoint device 102. Finishing options may include options to staple, hole punch, fold, and the like, and options to specify an orientation and/or a number of the selected finishing options (e.g., 1 staple, 2 staples, 1 staple top right corner, 1 staple top left corner, and the like).

In one embodiment, an electronic document may be generated by the endpoint device 102 and prepared for printing on the MFD 112. The endpoint device 102 may provide a print option on the display 104. When the print option is selected, the GUI 106 may appear to allow the user make selections of one or more different finishing options that are available on the MFD 112.

In one embodiment, the endpoint device 102 may include a processor 108 and a memory 110. The memory 110 may be a non-transitory computer readable medium that may store instructions that are executed by the processor 108. For example, the instructions may include instructions to generate the GUI 106 and instructions to display different menus based on various selections in the GUI 106, instructions to perform various functions based on the selections in the GUI 106, and the like. The endpoint device 102 may include additional hardware that is not shown (e.g., a graphical processing unit (GPU), input devices (e.g., a keyboard, a mouse, a trackpad, and the like), communication interfaces, and the like).

In one embodiment, when a print job is sent from the endpoint device 102 to the MFD 112, the MFD 112 may send information to the endpoint device 102 that can be used by the endpoint device 102 to determine which finishing options to show, display, or allow in the GUI 106. The MFD 112 may include a processor 116 and a memory 118. The memory 118 may be a non-transitory computer readable medium that may store instructions executed by the processor 116. The memory 118 may also store the capabilities of the MFD 112 that can be transmitted to the endpoint device 102.

In one embodiment, the memory 118 may also store finishing rules 120. The selections made by a user in the GUI 106 may be compared against the finishing rules 120 to determine if a combination of selections is acceptable. For example, some combination of finishing options may not be possible or acceptable. Thus, if the combination violates one of the finishing rules 120 an error message may be displayed, some of the finishing options may be greyed out in response to other finishing options that are selected such that they cannot be selected, and the like.

Although the GUI 106 is shown in FIG. 1 as being shown by the display 104 at the endpoint device 102, it should be noted that the GUI 106 may also be part of the MFD 112. For example, the MFD 112 may include a local display 122 that may also display the GUI 106. For example, the GUI 106 of the present disclosure may be presented to users when initiating a print job locally at the MFD 112.

Figure 2:
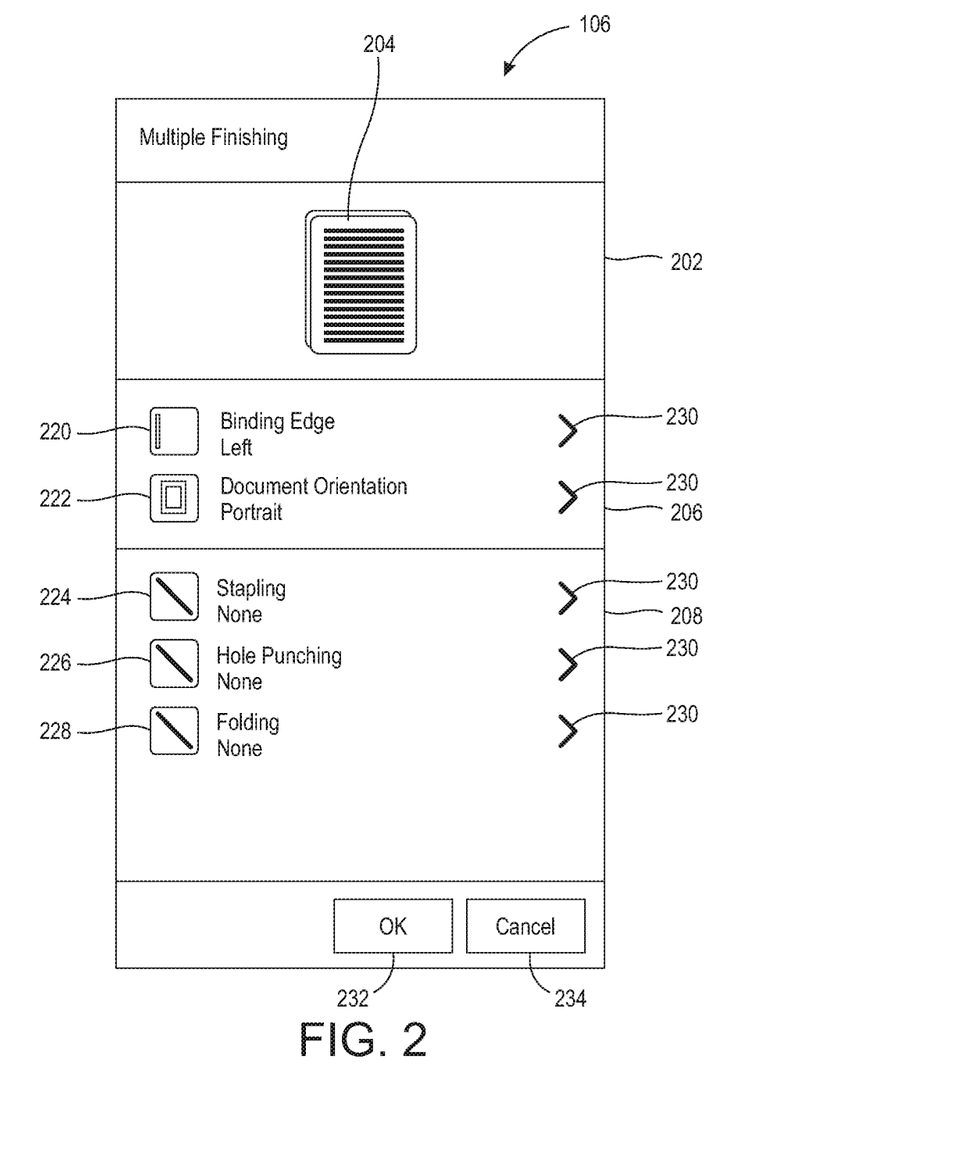
FIG. 2 illustrates an example screenshot of the GUI before any selections are made of the present disclosure.

FIGS. 2-9 illustrate various different views/screenshots of the GUI 106. FIG. 2 illustrates an example of the GUI 106 before any finishing options are selected. In one example, the GUI 106 may include a mimic window 202, and a finishing options window located below the mimic window 202. The finishing options window may include a section of document parameter options 206 and a section of finishing options 208.

In one embodiment, the mimic window 202 may include an animated graphical image 204. The image 204 may change in real-time to reflect the selections made from the document parameter options 206 and the finishing options 208. For example, when the binding edge is changed, the image 204 may also show the changed binding edge immediately after the selection is made. In another example, if two staples are selected, the image 204 may display two staples in the image 204 immediately after the selection is made. If the two staples are deselected, then the image 204 may immediately remove the staples from the image 204, and so forth. Thus, the image 204 may provide an accurate representation of how the selected document parameter options and finishing options may appear on the printed document or documents.

In one embodiment, the document parameter options 206 may include a binding edge option 210 and a document orientation option 212. In one embodiment, the finishing options 208 may include a stapling option 214, a hole-punching option 216, and a folding option 218. It should be noted that the document parameter options 206 are separated from the finishing options 208. For example, in some other GUIs, the document orientation may be mixed with some of the finishing options, which may provide a cluttered interface with many different options that can be confusing for a user.

In contrast, the present GUI 106 separates the document parameter options 206 from the finishing options 208 to provide a more streamlined and efficient presentation to the user. In addition, each option contains only a single option without being combined with other finishing options. For example, the binding edge option 210 includes only options to select a binding edge rather than mixing the binding edge and orientation or the binding edge and hole-punching in a single option, as shown in other GUIs.

In addition, the document parameter options 206 are displayed above or first, before the finishing options 208. This may provide a more logical flow as the selection of certain document parameter options 206 may determine which finishing options 208 may or may not be available for selection.

In one embodiment, each option may include an icon 220-228. Each icon 220-228 may change to reflect an image that is associated with the selection made for the respective option. The icons 220-228 may be located adjacent to each respective option. For example, the binding edge option may be associated with an adjacent icon 220. The document orientation option 212 may be associated with an adjacent icon 222. The stapling option 214 may be associated with an adjacent icon 224. The hole punching option 216 may be associated with an adjacent icon 226. The folding option 218 may be associated with an adjacent icon 228.

In one embodiment, the icons 220-228 may be blank or have a slash displayed when no option is selected. In one embodiment, when the GUI 106 is displayed in response to a print job request submitted by the endpoint device 102, some of the options may be automatically selected. For example, as shown in FIG. 2, the most common document parameter options 206 that are used may be the default selected options. For example, the binding edge option 210 may be automatically selected to be "left" and the document orientation option 212 may be automatically selected to be "portrait". The icon 220 may show a line along the left side to display that the left edge is selected for the binding edge and the icon 222 may show a document in a portrait orientation to display that the portrait orientation is selected.

Figure 3:
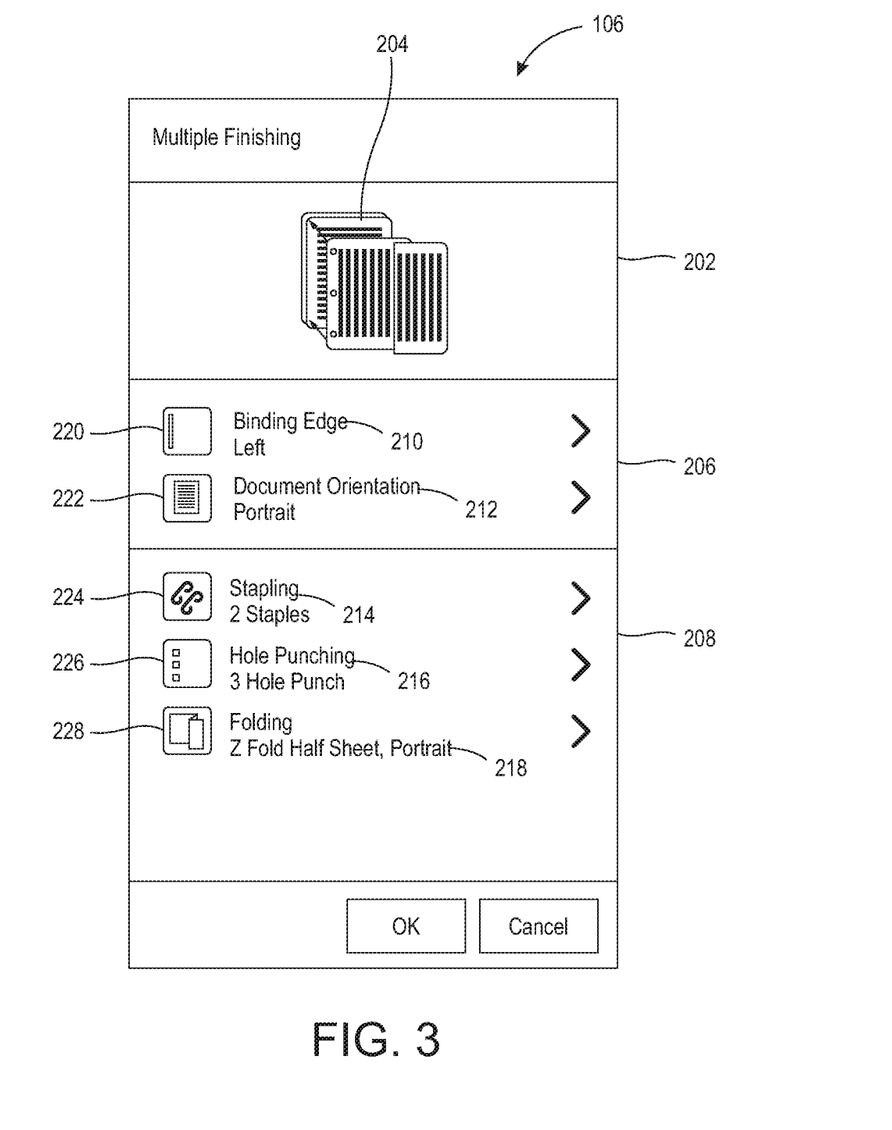
FIG. 3 illustrates an example screenshot of the GUI after selections are made of the present disclosure.

FIG. 3 illustrates an example screenshot of the GUI after selections are made for each one of the options 210-218. For example, 2 staples may be selected for the stapling option 214, 3 hole punch may be selected for the hole-punching option 216, and a z-fold half sheet, portrait may be selected for the folding option 218. Accordingly, the corresponding icons 224, 226, and 228 may display images or graphics of the selections for each option. For example, the icon 224 may illustrate two staples. The icon 226 may illustrate three holes. The icon 228 may illustrate a z-fold in a portrait orientation.

In addition, the image 204 in the mimic window 202 may animate or display the selections. For example, the document in the mimic window 202 may be animated to show the document folding in-and-out in a portrait orientation for the z-fold. In addition, the document may be animated to show the front page moving towards the pages in the background to animate the stapling with the two staples that are selected. In addition, the document in the mimic window 202 may animate three holes being punched in the document. In another embodiment, the image may be a simple graphical representation (e.g., a non-animated or static image) of the selections that are made.

Referring back to FIG. 2, in one embodiment, the GUI 106 may also include a button 232 and a button 234. The button 232 may be a confirmation or OK button to proceed with the print job in accordance with the selected options. The button 234 may be a cancel button to cancel the print job.

In one embodiment, the GUI 106 may also include selection icons 230 for each option 210-218. The selection icon 230 may activate a new window of options for the respective option 210-218 that is selected. Each one of the options 210-218 may be selected to view additional options associated only with the selected option.

Figure 4:
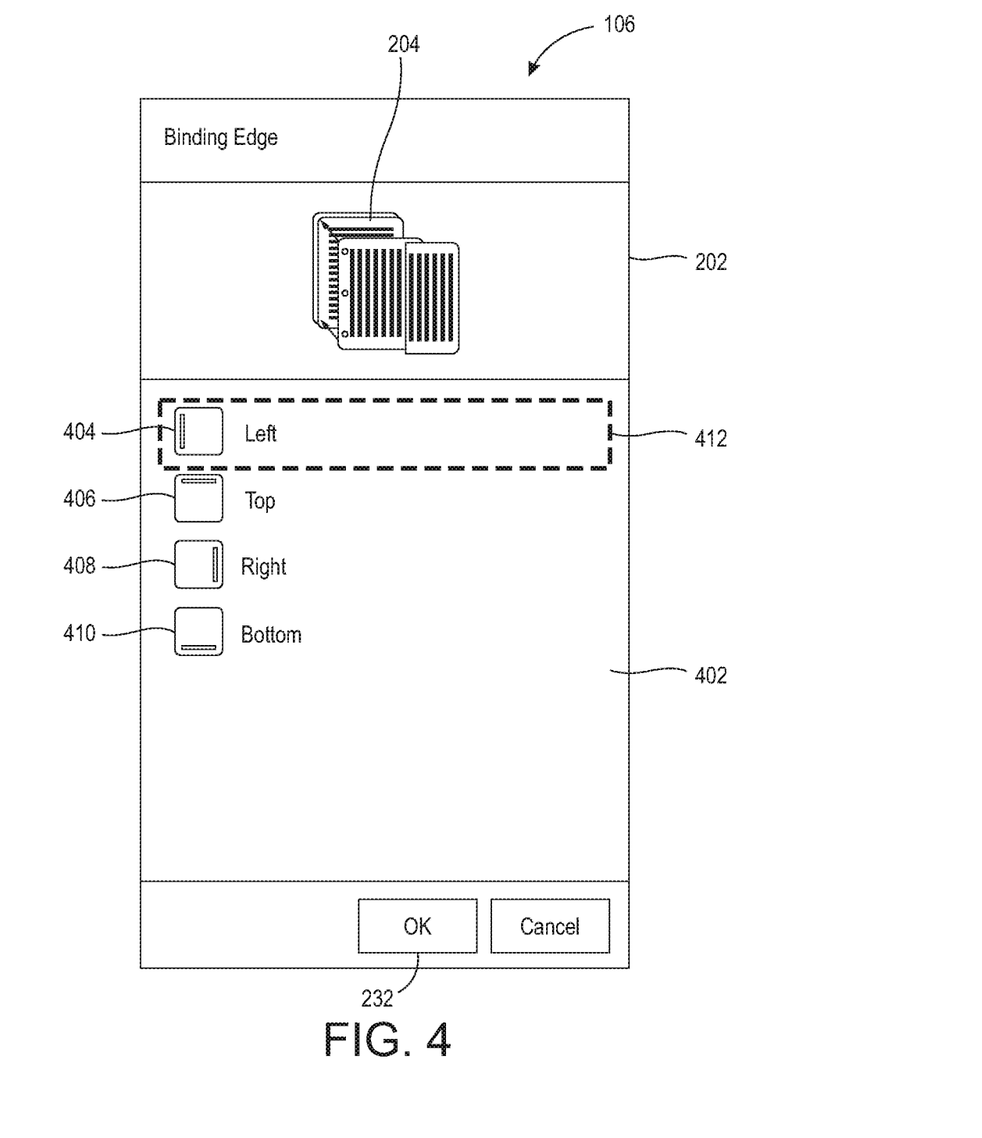
FIG. 4 illustrates an example screenshot of binding edge options of the present disclosure.

For example, when the selection icon 230 associated with the binding edge option 210 is selected, a new window of binding edge options 402 may appear in the finishing options window as shown in FIG. 4. In other words, the window of binding edge options 402 may replace the document parameter options 206 and the finishing options 208 in the area below the mimic window 202. In addition, the selected binding edge option may appear along a top of the mimic window 202 to allow a user to easily identify that the window 402 is associated with the binding edge options 210.

In one embodiment, the window of binding edge options 402 may provide icons 404-410 that illustrate the available selections. For example, the icon 404 may be a left binding edge, the icon 406 may be a top binding edge, the icon 408 may be a right binding edge, and the icon 410 may be a bottom binding edge. In one embodiment, a selection window 412 may be drawn around the selected option. The selection window 412 may be a dashed line as shown in FIG. 4, a solid line, a highlight, and the like.

In one embodiment, the mimic window 202 may display the image 204 associated with the selection immediately. In one embodiment, the image 204 may continue to display the other options that are selected (e.g., stapling options, hole punch options, folding options, and the like) while the binding edge options 210 are selected. After the desired option is selected, the button 232 may be selected to proceed back to the document parameter options 206 and the finishing options 208 as shown in FIGS. 2 and 3.

Figure 5:
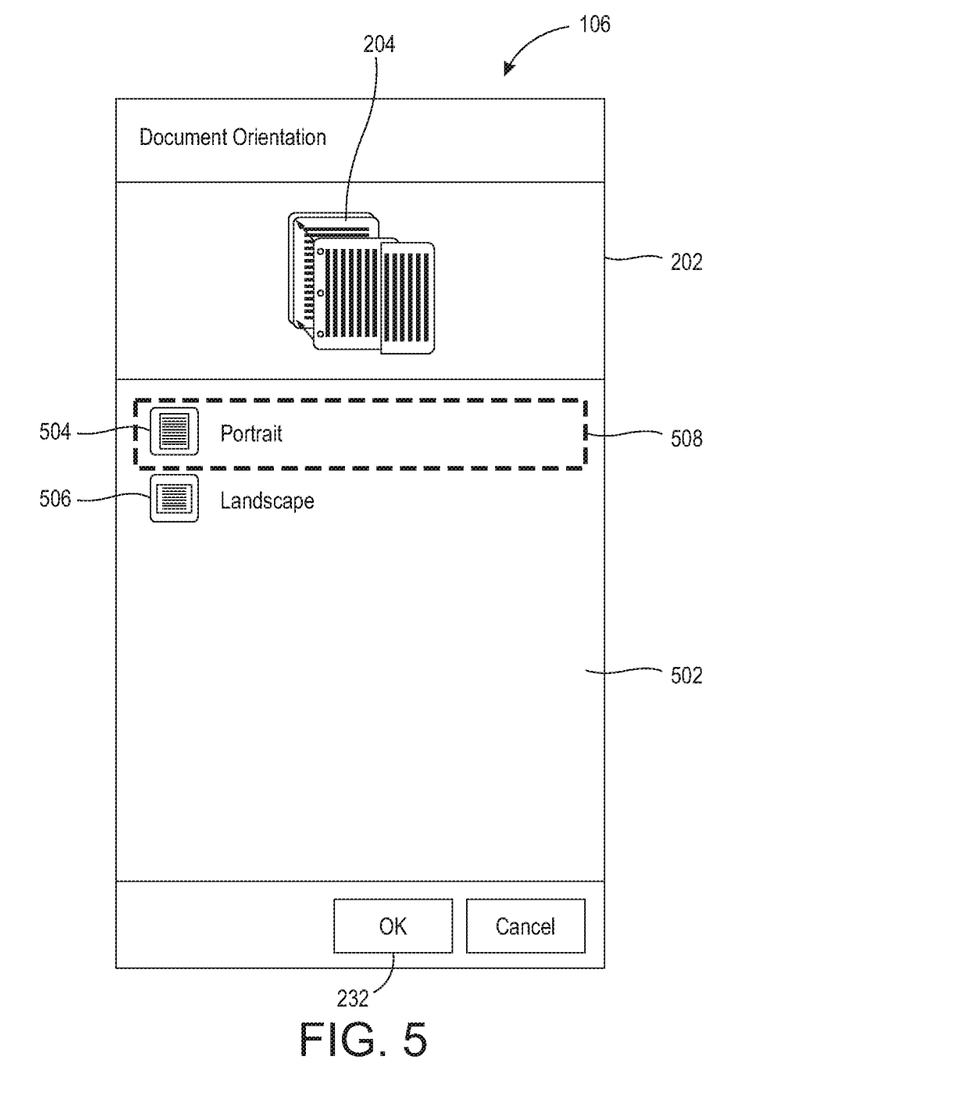
FIG. 5 illustrates an example screenshot of document orientation options of the present disclosure.

FIG. 5 illustrates an example screenshot of the GUI 106 after the selection icon 230 for the document orientation option 212 is selected. In one embodiment, a new window of document orientation options 502 may be displayed where the finishing options window was previously shown. In one example, the window 502 may include icons 504 and 506 that illustrate the available selections. For example, the icon 504 may include a portrait orientation and the icon 506 may include a landscape orientation. FIG. 5 also illustrates a selection window 508 when a selection is made. After the desired option is selected the button 232 may be selected to proceed back to the document parameter options 206 and the finishing options 208 as shown in FIGS. 2 and 3.

Figure 6:
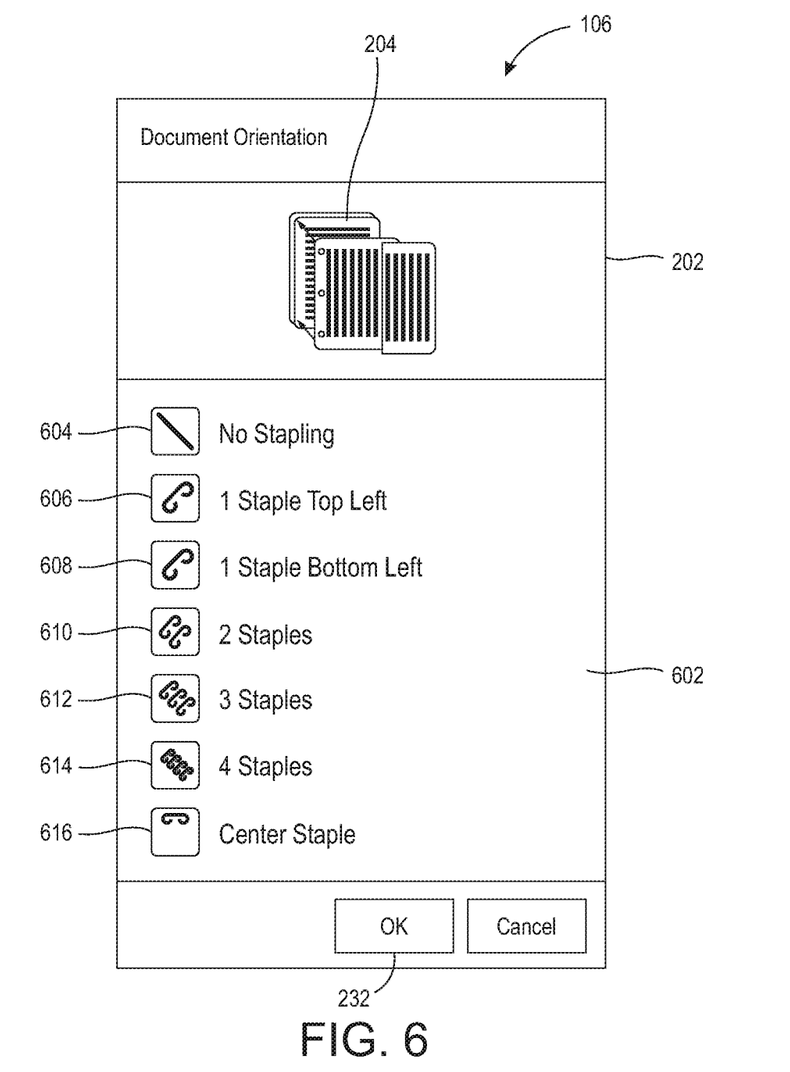
FIG. 6 illustrates an example screenshot of stapling options of the present disclosure.

FIG. 6 illustrates an example screenshot of the GUI 106 after the selection icon 230 for the stapling option 214 is selected. In one embodiment, a new window of stapling options 602 may be displayed where the finishing options window was previously shown. In one example, the window 602 may include icons 604-616 that illustrate the available selections. For example, the icon 604 may include a no stapling option, the icon 606 may include a single staple, top left option, the icon 608 may include a single staple, bottom left option, the icon 610 may include a two staple option, the icon 612 may include a three staple option, the icon 614 may include a four staple option, and the icon 616 may include a single center staple icon.

As noted above, some of the options may be based on previous options that are selected. For example, when left binding is selected, the single staple options 606 and 608 may be shown only with top left and bottom left options. However, if right binding were selected, the single staple options 606 and 608 may be shown with only top right and bottom right options. After the desired option is selected, the button 232 may be selected to proceed back to the document parameter options 206 and the finishing options 208 as shown in FIGS. 2 and 3.

Figure 7:
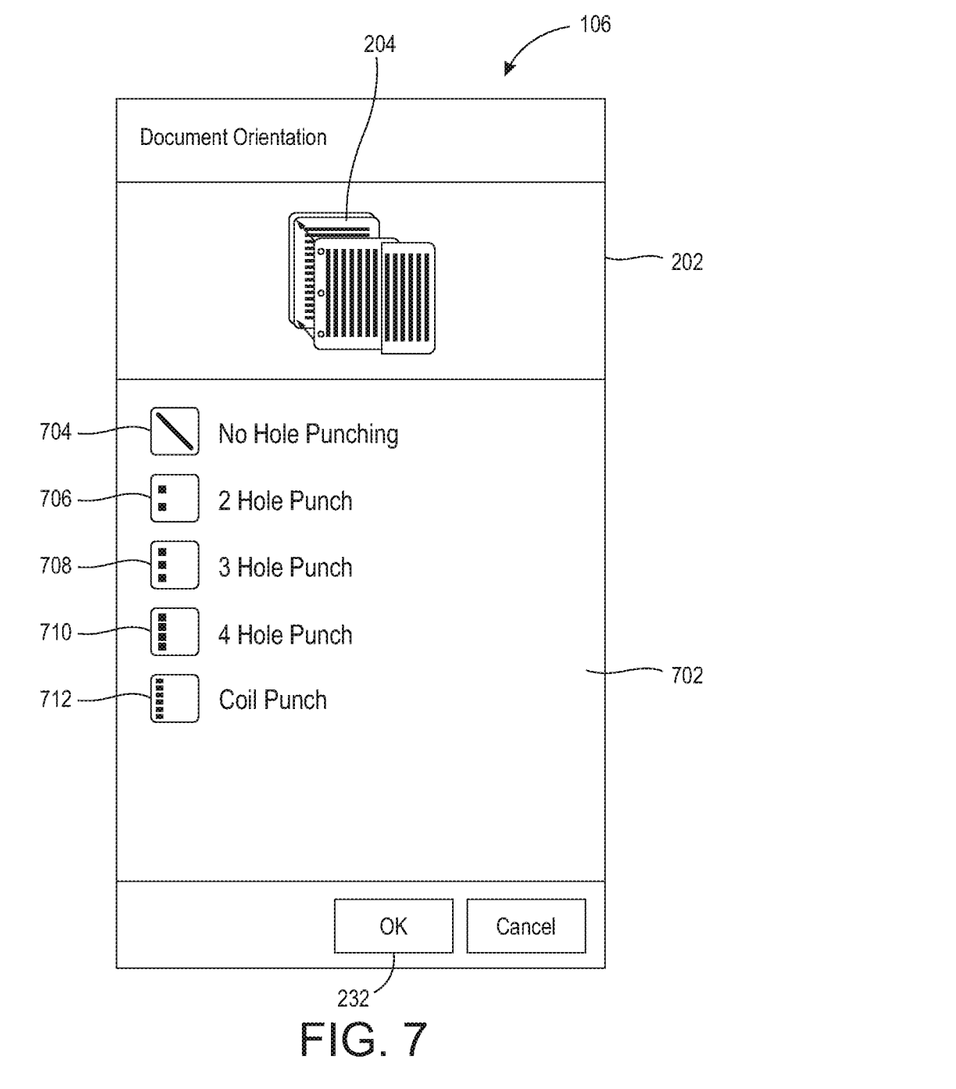
FIG. 7 illustrates an example screenshot of hole punching options of the present disclosure.

FIG. 7 illustrates an example screenshot of the GUI 106 after the selection icon 230 for the hole-punching option 216 is selected. In one embodiment, a new window of hole-punching options 702 may be displayed where the finishing options window was previously shown. In one example, the window 702 may include icons 704-712 that illustrate the available selections. For example, the icon 704 may include a no hole punching option, the icon 706 may include a two hole punch option, the icon 708 may include a three hole punch option, the icon 710 may include a four hole punch option, and the icon 712 may include a coil punch option. After the desired option is selected, the button 232 may be selected to proceed back to the document parameter options 206 and the finishing options 208 as shown in FIGS. 2 and 3.

Figure 8:
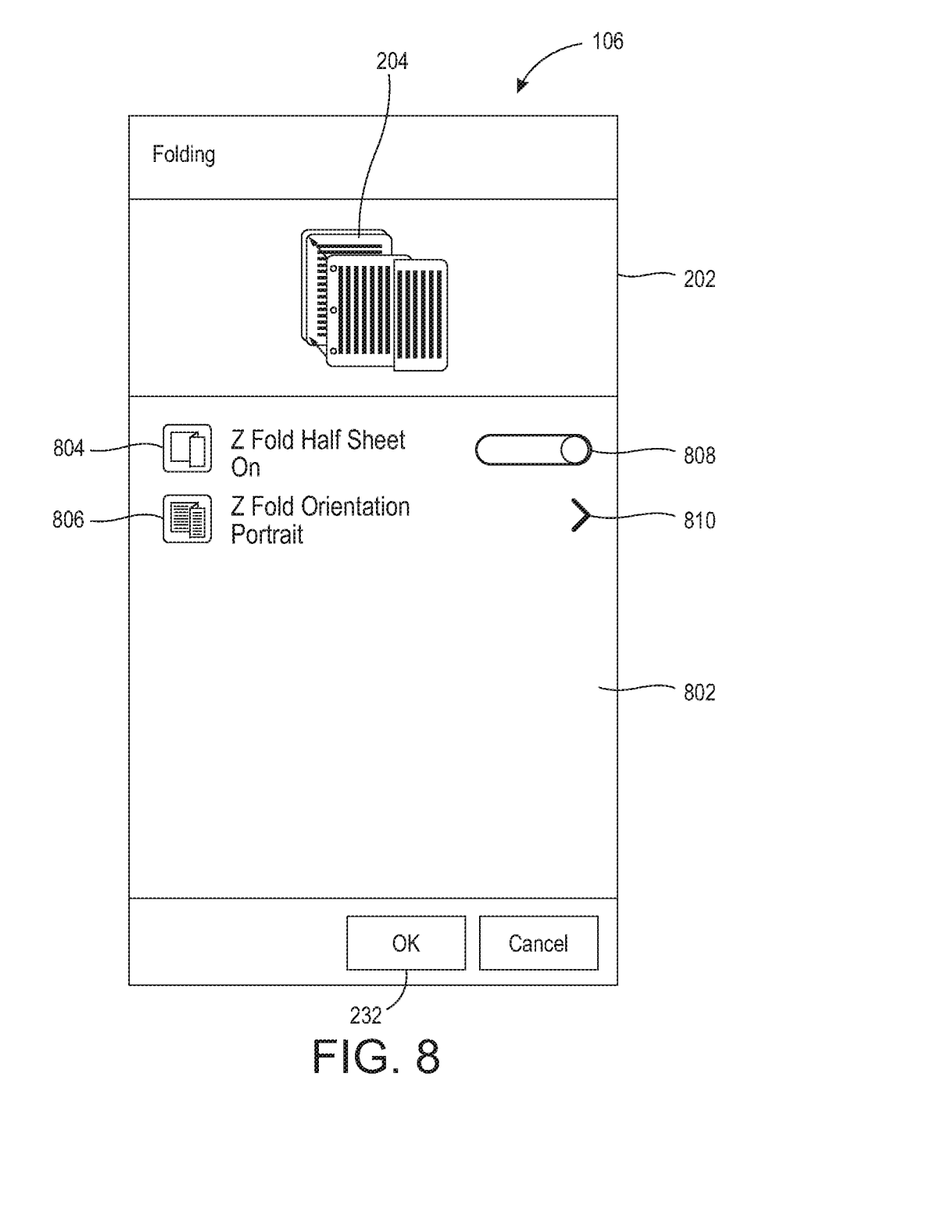
FIG. 8 illustrates an example screenshot of z-folding options of the present disclosure.

FIG. 8 illustrates an example screenshot of the GUI 106 after the selection icon 230 for the folding option 218 is selected. The folding option 218 may be for z-folding options. Some MFDs 112 may be capable of performing a z-fold in the document as a finishing option. In addition, some MFDs 112 may perform the z-fold in the portrait orientation or the landscape orientation. However, none of the GUIs that are currently available allow a user to specify these finishing options for the z-fold.

In one embodiment, a new window of folding options 802 may be displayed where the finishing options window was previously shown. In one example, the window 802 may include icons 804 and 806 that illustrate available selections. In one embodiment, the icon 804 may be associated with a selectable button or slider 808 that enables or disables the z-fold. For example, the slider 808 may turn on the z-fold finishing option or turn off the z-fold finishing option.

Figure 9:
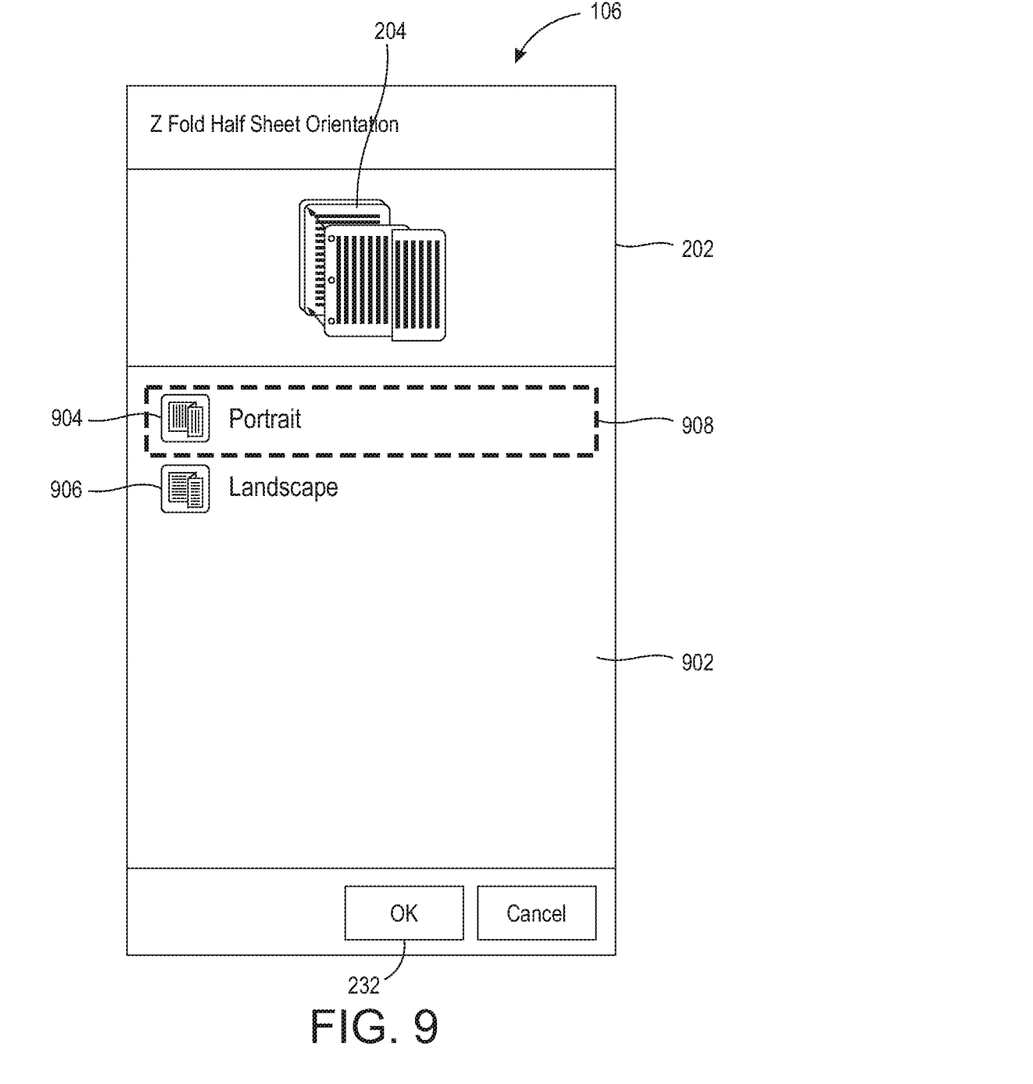
FIG. 9 illustrates an example screenshot of z-folding orientation options of the present disclosure.

In one embodiment, the icon 806 may be associated with a z-fold orientation that also includes a selection icon 810. The selection icon 810 may cause a new z-fold orientation window 902 to appear as illustrated in FIG. 9. The z-fold orientation window 902 may allow a user to specify the z-fold in a portrait orientation as shown by an icon 904 or in a landscape orientation as shown by an icon 906. FIG. 9 also illustrates a selection window 908 to indicate the option that the user has selected. After the desired option is selected, the button 232 may be selected to proceed back to the window of folding options 802 as shown in FIG. 8.

Referring back to FIG. 8, the selected z-fold orientation may be shown by the image 204 in the mimic window 202 as well as by the icon 806. After the desired options are selected, the button 232 may be selected to proceed back to the document parameter options 206 and the finishing options 208 as shown in FIGS. 2 and 3.

It should be noted that although various finishing options are discussed above and illustrated in FIGS. 2-9, that the available options may be a function of the finishing capabilities of the MFD 112. Some options may not be shown in the GUI 106 or additional options may be shown in the GUI 106. However, the GUI 106 may separate each option as an independent selectable option. In other words, none of the options that are provided in the GUI 106 are mixed or shown as a combination of two or more document parameter options and finishing options. In addition, the GUI 106 is arranged to include a finishing options window that includes the document parameter options separate from the finishing options.

In addition, the GUI 106 may communicate with the MFD 112 each time a selection is made. In other words, the GUI 106 and the MFD 112 may communicate in real-time as the selections are made in the GUI 106.

For example, the GUI 106 may send each selection to the MFD 112 and the MFD 112 may check the selection against the finishing rules 120. As discussed above, the finishing rules 120 may include pre-defined rules that may only define allowed combinations of document parameter options 206 and finishing options 208, only define dis-allowed combinations of document parameter options 206 and finishing options 208, or define both allowed and dis-allowed combinations of document parameter options 206 and finishing options 208.

In one embodiment, when a selection causes other possible selections to possibly violate the finishing rules 120, the MFD 112 may send a control signal to the endpoint device 102. The control signal may include information or data regarding which selections would violate the finishing rules 120. The endpoint device 102 may then cause the GUI 106 to grey out or remove those options from the GUI 106 or from the options that are shown in the windows 402, 502, 602, 702, 802, or 902.

In another embodiment, the GUI 106 may allow the user to select all of the desired options. After the selections are made, the GUI 106 may transmit the selections to the MFD 112 via the endpoint device 102. The selections may be compared to the finishing rules 120 to determine if any of the selections violate the finishing rules 120. If any selections violate the finishing rules 120, the MFD 112 may send a notification message or an error message to the endpoint device 102. The endpoint device 102 may cause the message to be shown in the display 104. The message may specify which combination of selections violates the finishing rules 120. In one embodiment, the message may include suggestions regarding which selections should be changed.

Thus, the GUI 106 of the present disclosure presents finishing options in a streamlined and efficient fashion that allows a user to easily select the desired options. In addition, the GUI 106 presents additional finishing options (e.g., various staple locations, different z-fold orientations, and the like) that were not presented as selectable options in previous GUIs for print job requests.

Figure 10:
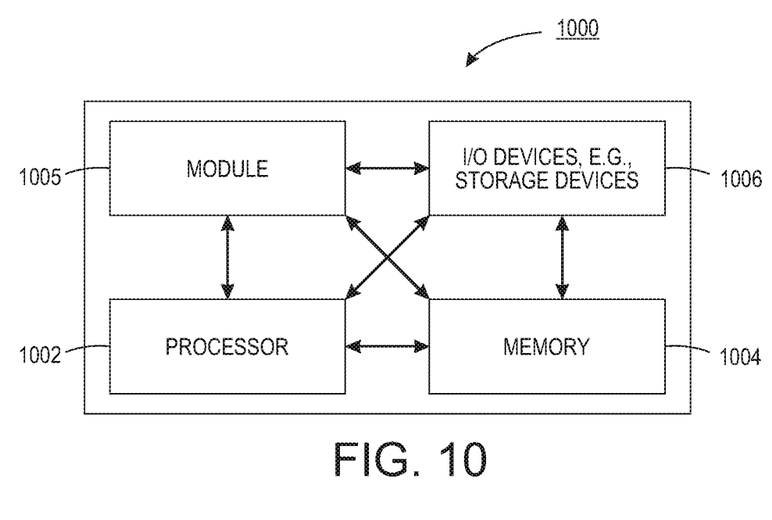
FIG. 10 illustrates a high-level block diagram of an example computer suitable for use in performing the functions described herein.

FIG. 10 depicts a high-level block diagram of a computer that is dedicated to perform the functions described herein. As depicted in FIG. 10, the computer 1000 comprises one or more hardware processor elements 1002 (e.g., a central processing unit (CPU), a microprocessor, or a multi-core processor), a memory 1004, e.g., random access memory (RAM) and/or read only memory (ROM), a module 1005 for generating a graphical user interface (GUI) to provide a plurality of finishing options for a print job, and various input/output devices 1006 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 1005 for generating a graphical user interface (GUI) to provide a plurality of finishing options for a print job (e.g., a software program comprising computer-executable instructions) can be loaded into memory 1004 and executed by hardware processor element 1002 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 1005 for generating a graphical user interface (GUI) to provide a plurality of finishing options for a print job (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A graphical user interface (GUI) to provide a plurality of finishing options for a print job, comprising:
    a mimic window to provide real-time animations of selected document parameter options and finishing options; and
    a finishing options window below the mimic window, the finishing options window comprising:
        a plurality of document parameter options, wherein a selection of one of the plurality of document parameter options causes a new document parameter window of additional document parameter options associated with a document parameter option that is selected to open in the finishing options window; and
        a plurality of finishing options that are displayed below the plurality of document parameter options, wherein a selection of one of the plurality of finishing options causes a new finishing option window of additional finishing options associated with a finishing option that is selected to open in the finishing options window, wherein the plurality of finishing options comprises a stapling option, a hole punching option, and a z-folding option, wherein a selection of an option from the stapling option causes a corresponding icon of the option that is selected to appear next to the stapling option.

2. The GUI of claim 1, wherein the plurality of document parameter options comprises a binding edge option and a document orientation option.

3. The GUI of claim 2, wherein a selection of a binding edge in the binding edge option causes a corresponding icon of the binding edge that is selected to appear next to the binding edge option.

4. The GUI of claim 2, wherein a selection of a document orientation in the document orientation option causes a corresponding icon of the document orientation that is selected to appear next to the document orientation option.

5. The GUI of claim 1, wherein the stapling option comprises a single staple option at a top left and a single staple at a bottom left.

6. The GUI of claim 1, wherein a selection of a hole punch from the hole punching option causes a corresponding icon of the hole punch that is selected to appear next to the hole punching options.

7. The GUI of claim 1, wherein the z-folding option comprises an option to enable a z-fold and a z-fold orientation option.

8. The GUI of claim 7, wherein the z-fold orientation option comprises a portrait z-fold option and a landscape z-fold option.

9. The GUI of claim 1, wherein a selection of a z-fold from the z-folding option causes a corresponding icon of the z-fold that is selected to appear next to the z-folding option.

10. A non-transitory computer-readable medium storing a plurality of instructions, which when executed by a processor, causes the processor to perform operations for generating a graphical user interface (GUI) to provide a plurality of finishing options for a print job, comprising:
    instructions to generate a mimic window to provide real-time animations of selected document parameter options and finishing options; and
    instructions to generate a finishing options window below the mimic window, the finishing options window comprising:
        a plurality of document parameter options, wherein a selection of one of the plurality of document parameter options causes a new document parameter window of additional document parameter options associated with a document parameter option that is selected to open in the finishing options window; and
        a plurality of finishing options that are displayed below the plurality of document parameter options, wherein a selection of one of the plurality of finishing options causes a new finishing option window of additional finishing options associated with a finishing option that is selected to open in the finishing options window, wherein the plurality of finishing options comprises a stapling option, a hole punching option, and a z-folding option, wherein the z-folding option comprises an option to enable a z-fold and a z-fold orientation option.

11. The non-transitory computer-readable medium of claim 10, wherein the plurality of document parameter options comprises a binding edge option and a document orientation option.

12. The non-transitory computer-readable medium of claim 11, wherein a selection of a binding edge in the binding edge option causes a corresponding icon of the binding edge that is selected to appear next to the binding edge option.

13. The non-transitory computer-readable medium of claim 11, wherein a selection of a document orientation in the document orientation option causes a corresponding icon of the document orientation that is selected to appear next to the document orientation option.

14. The non-transitory computer-readable medium of claim 10, wherein the z-fold orientation option comprises a portrait z-fold option and a landscape z-fold option.

15. The non-transitory computer-readable medium of claim 10, wherein a selection of a z-fold from the z-folding option causes a corresponding icon of the z-fold that is selected to appear next to the z-folding option.

* * * * *